Dec. 12, 1967 G. A. OLIVER 3,358,128

DELAY LINE ARITHMETIC CIRCUIT

Filed Aug. 31, 1964 2 Sheets-Sheet 1

INVENTOR.
GLENN A. OLIVER

BY Charles S. Hall

DELAY LINE ARITHMETIC CIRCUIT

Filed Aug. 31, 1964 2 Sheets-Sheet 2

INVENTOR.
GLENN A. OLIVER

BY Charles S. Hall 3,358,128
DELAY LINE ARITHMETIC CIRCUIT
Glenn A. Oliver, Berwyn, Pa., assignor to Burroughs Corporation, Detroit, Mich., a corporation of Michigan
Filed Aug. 31, 1964, Ser. No. 393,109
15 Claims. (Cl. 235—167)

ABSTRACT OF THE DISCLOSURE

A system for performing the addition or subtraction of two numbers, one of which has its digits recorded in the form of time-domain encoded signals in a cyclic memory. The recorded signals representing the digits are sequentially withdrawn from the memory in order from the least significant digit to the most significant digit and delayed an amount proportional to the corresponding digits of the other number. The delayed signals represent the result of the arithmetic operation and are monitored during predetermined time intervals to detect a carry condition in the case of addition for example. When no carry condition is detected, the sum is recorded in the memory. When a carry condition is detected, the partial sum is recorded in the memory, and one unit of additional delay is added to the delaying operation for the next higher order digit.

This invention relates to electronic arithmetic circuitry and, more particularly, to electronic arithmetic circuitry which employs a cyclic memory in combination with a tapped delay line for selectively delaying signals by amounts proportional to the numbers involved in the arithmetic operation such that the total delay is proportional to the number representing the outcome of the arithmetic operation.

Two basic techniques which have been employed to encode numerical information to be processed by electronic calculators, data processors, and the like are: pulse train encoding and time-domain encoding. For example, any digital value, 0 or 1 to 9, may be represented either in a pulse train code in which a digital value is represented by a plurality of pulses equal in number to the digital value to be encoded, or in a time-domain code in which the digital value is represented by a single pulse positioned at the corresponding moment of the code. In both encoding schemes, pulse-controlled time intervals are generally employed wherein basic program pulses define a cycle, and each time interval is further subdivided into unit increments corresponding to the moments of the code.

Prior art electronic circuits which have been widely employed in arithmetic calculating machines have generally utilized, as the basic element or cell, electronic components which have two or more distinct signal states or levels; for example, diodes, vacuum tubes, transistors, relays, etc. Such elements or cells are arranged to form logical gating and storage means which are then interconnected in a particular configuration to accomplish a desired logical function.

One group of prior art arithmetic calculating machines employs an array of such logical elements built from multilevel electronic components. For example, in binary coded decimal machines, the decimal digit is represented in a corresponding binary code such as a four place positionally coded binary number, in which case each place of the binary number is individually operated on by means of a binary cell such as, for example, the Eccles-Jordan bistable multivibrator and a logical gating means.

Another group of prior art arithmetic calculating machines utilizes logical gating means in combination with a plurality of cascaded variable-length delay means. In machines employing cascaded variable-length delay means, the numbers involved in an arithmetic operation selectively determine the effective length of the delay medium by controlling associated logical gating means and a cycle-initiating pulse is selectively delayed in the cascaded delay means by amounts proportional to the numbers involved in the arithmetic operation, thereby generating an output signal delayed an amount proportional to the outcome of the arithmetic operation.

In each of these groups of prior art calculating machines, a large number of logical circuits and delay or storage means is normally required to perform even a relatively simple arithmetic operation.

It is, therefore, the principal object of this invention to provide improved delay line apparatus for performing arithmetic calculations in which the digits of one of the numbers to be operated upon is represented as time-domain encoded electric signals and in which each of the coded signals is time-displaced in a single tapped delay line in accordance with the magnitude of the corresponding digits of the other number to be operated upon.

Another object is to provide a digital arithmetic circuit arranged to perform an arithmetic operation by interpreting a time delay of a previously time-domain encoded signal.

Another object is to provide an improved digital delay line adder which is readily and economically adapted to variable radix operation.

Another object is to provide a simplified dynamic delay-line adder having means for detecting and automatically executing carry operations without requiring the writing and subsequent removal and time-displaced reapplication of signals proportional to the sum.

Applicant achieved the above-listed objects and other desirable features by employing, in combination, a memory having a predetermined cycle of operation, a single delay line having an input terminal and a plurality of gated output terminals spaced along its length for selectively and controllably delaying input signals, and control means for generating a basic timing interval and controlling, in accordance therewith, the serial extraction of time-domain encoded information from the memory, the application thereof to the input of the delay means, the detection and automatic execution of a carry condition, and the application of the time-displaced signal to the memory.

In operation, data representing one of the numbers involved in the arithmetic operation are first stored in the memory as time-domain encoded information. Upon a cycle-initiating command from the control means, the previously recorded information is serially read and erased from the cyclic memory and applied as the input signal to the delay line. The other number involved in the arithmetic operation selectively actuates, through the control means, appropriate AND gate means associated with the output taps of the delay line whereby, as the initially time-domain encoded information propagates through the delay media, an output signal proportional to the outcome of the arithmetic operation is generated at the activated logical gating means. The signals selectively gated from the delay line tap are analyzed on a time basis to determine, for example in an adder, the presence of a carry condition which, when detected, automatically inserts a unit delay into the next higher order operation. Thereafter, the time-displaced signal, which is proportional to the outcome of the arithmetic operation, is written into the memory and may be utilized to activate an appropriate output device.

The above-listed objects and other aspects of applicant's invention will be further explained in the following detailed description and illustrated in the accompanying drawings which disclose, by way of example, the preferred embodiments for practicing applicant's invention. For a more complete understanding of applicant's invention, reference may be had to the drawings in which:

FIG. 1 is a block diagram of a digital arithmetic calculator embodying the principles of applicant's invention.

FIG. 2*a* is a schematic representation of a tapped delay line utilizable in applicant's arithmetic calculator.

FIG. 2*b* is a graphical representation of idealized wave forms which emanate from successive taps as a pulse propagates through the delay line of FIG. 2*a*.

Figure 5A:
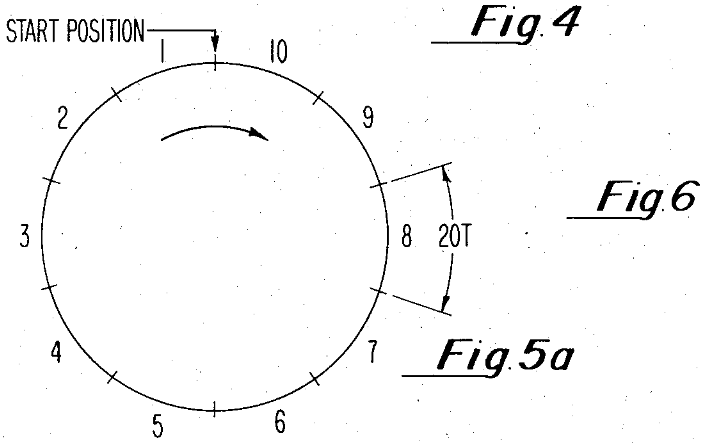

FIG. 5*a* shows a detail of register locations disposed about the periphery of a magnetic drum memory.

Figure 5B:
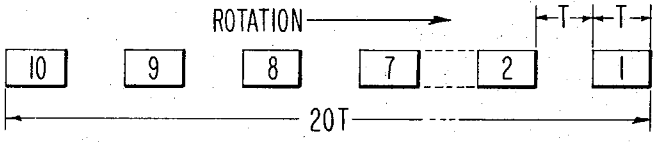

FIG. 5*b* shows a detail of a register organization within a particular memory location of the magnetic drum memory.

Figure 5C:
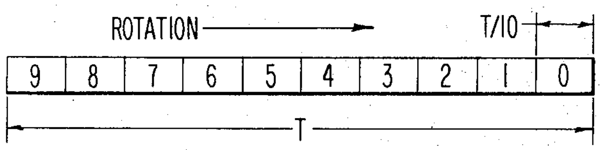

FIG. 5*c* shows a detail of digit organization within a particular register of the magnetic drum memory.

Figure 6:
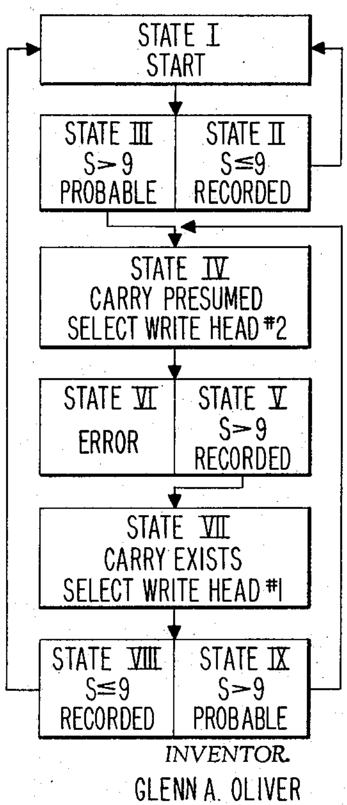

FIG. 6 is a logic flow diagram illustrating a sequence of logical operations executed in performing addition in accordance with applicant's invention for detecting and effecting a carry operation.

Figure 1:
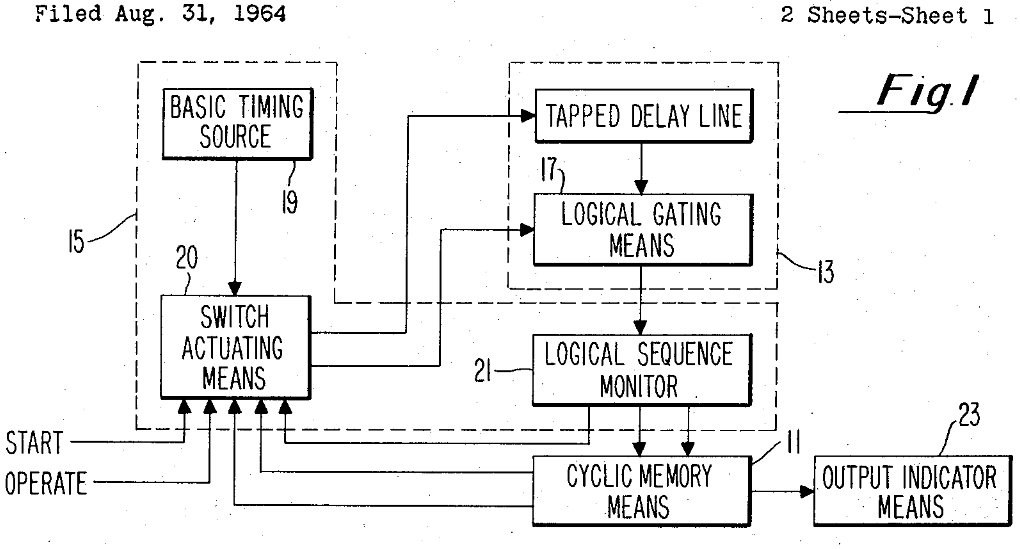

Referring now to FIG. 1, there is shown a block diagram illustrating the interconnection of the functional components of a delay line calculating machine in accordance with applicant's invention. Applicant's arithmetic calculator comprises a cyclic memory 11 having a predetermined cycle of operation, a tapped delay line arithmetic unit 13 for selectively delaying signals applied thereto, and control means 15 for controlling the basic operation of the calculator in accordance with a predetermined timing pattern.

The cyclic memory 11 may, for example, comprise a rotatable magnetic memory drum of the type, well known in the art, having a plurality of magnetizable tracks for storing information disposed about its periphery and a plurality of spaced-apart read-write heads operably associated therewith. The tapped delay line may be any type well known in the art, for example, electromagnetic, magnetostrictive, or sonic, which has output taps spaced along its length.

In practicing applicant's invention, logical gating means 17 is utilized to selectively gate output signals from selected ones of the taps disposed along the length of the delay line.

The control means 15, hereinafter to be more fully described, may comprise a source of basic timing pulses 19, switch actuating means 20 for controlling the logical gating means thereby selectively gating the output of the plurality of taps along the delay line, and logical sequence means 21 for monitoring the respective output of the delay line taps to determine the presence of a carry or borrow condition and for selectively inserting or deleting a unit delay in the input path of the next higher order operation in response thereto.

The first step in accomplishing an arithmetic operation in an apparatus embodying applicant's invention involves the storing in the cyclic memory of time-domain encoded signals representative of a first group of numbers involved in the arithmetic operation. This may, for example, be accomplished by entering the appropriate digits on a keyboard, not shown, as the input to the switch actuating means 20, thereby selectively controlling the effective length of the delay to be inserted in the path of basic timing pulses which are applied to the arithmetic unit 13 as the keyboard inputs are scanned. The signals emanating from the appropriate taps of the delay line are thereby gated by the logical gating means 17 at a time proportional to the value of such number and these time-domain encoded signals may then be applied to the cyclic memory.

Thereafter, the second numbers involved in the arithmetic operation may be entered upon a keyboard, thereby selectively actuating through the control means 15 the appropriate logical gating means 17 associated with the arithmetic unit 13 such that the previously recorded time-domain encoded signals, when read from the cyclic memory 11 and serially applied via control means 15 to the arithmetic unit 13, will be further delayed an amount proportional to the second group of numbers involved in the arithmetic operation. The signals tapped from the delay line via the energized gating means 17, in response to the application of the previously encoded signals, are continuously analyzed by the logical sequence monitor 21 to determine, on a time basis, the presence of a carry or borrow condition and, upon detection of a carry or borrow condition, a unit delay is automatically inserted in or deleted from the input path of the next higher order operation.

The signals emerging from the logical sequence monitor 21 may be applied via an appropriate write head to the cyclic memory and may also be utilized to trigger appropriate output indicator means 23. The basic timing source 19 for example, may comprise an auxiliary track on the cyclic memory 11 having associated read heads such that the rotation of the cyclic memory periodically generates a pattern of basic timing pulses. Alternately a source of timing pulses may be generated, for example, from a stable oscillator.

Figure 2A:
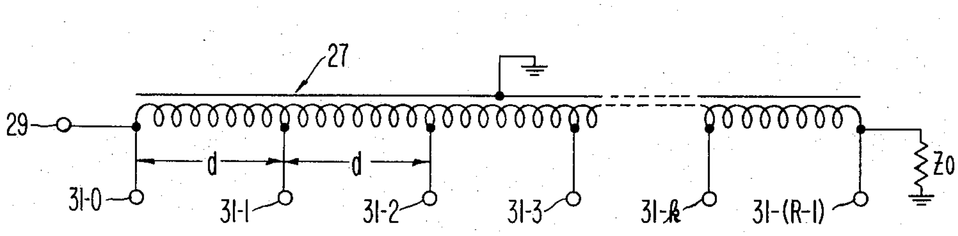

Referring now to FIG. 2*a*, a schematic diagram of a tapped delay line 27, utilizable in applicant's dynamic arithmetic calculating machine, is shown having an input terminal 29 and plurality of output taps 31–0 through 31–(R–1) spaced along its length where R is the radix or base of the numbering system to be employed. As hereinbefore stated, the tapped delay line may, for example, be of the electromagnetic, magnetostrictive, or sonic type wherein a pulse applied to input terminal 29 would propagate through the delay line 27 at a characteristic velocity determined by the properties of the delay medium.

Figure 2B:
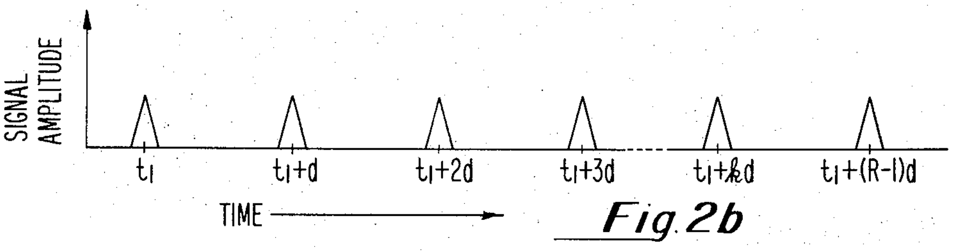

The time-domain encoding of decimal numbers, as an illustrative radix, and the properties of a tapped delay line will now be briefly reviewed in conjunction with FIGS. 2*a* and 2*b*. A pulse applied at input terminal 29, shown in FIG. 2*b* at time $t_1$, will propagate through the delay media at a characteristic velocity determined by the properties of the delay media and will generate output pulses at successive taps at times dependent upon the spacing between adjacent taps. If such succeeding output terminals are separated by a unit delay of $d$ seconds and there are a number, $N=R-1$, of units of delay in the line, then the output pulses generated at successive taps will appear at the times shown in FIG. 2*b*.

Assuming the termination of the delay line in its characteristic impedance to damp out all unwanted reflections, and assuming the application of a single input pulse to the line at any one time, this single pulse will generate a signal at successive output terminals as the input pulse propagates through the delay media. A pulse will appear at the $p^{th}$ terminal at a time $t_p=t_1+pd$ where $d$ and $t_1$ represent the unit delay between successive taps and the time of the input pulse measured from a reference time $t_0$, respectively. Thus, a digit may be time-domain encoded by applying a pulse to the delay media and thereafter selectively tapping an output from an appropriate tap after the elapse of the time interval proportional to the number to be encoded.

Figure 3:
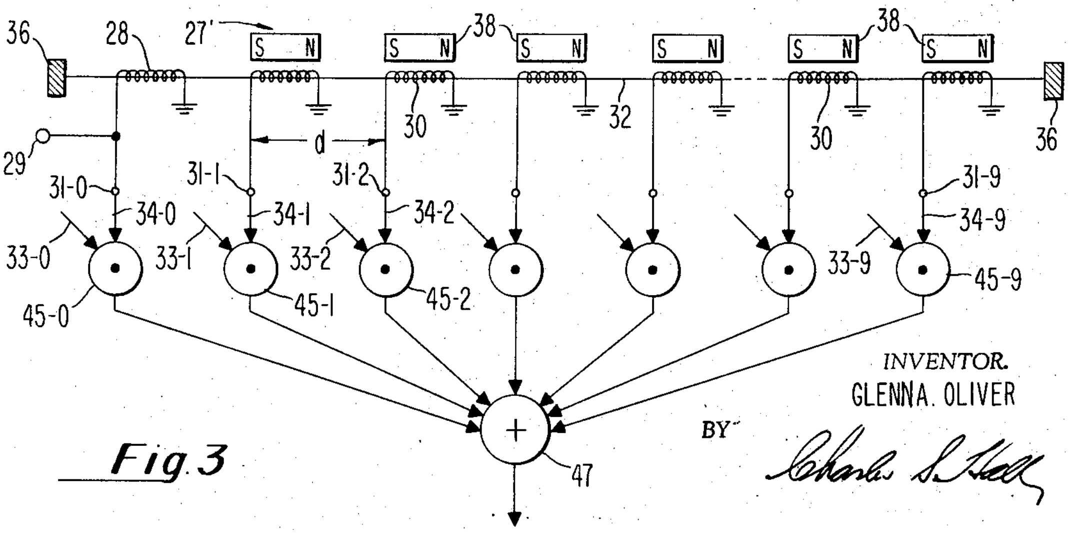
FIG. 3 is a schematic diagram of a dynamic delay line arithmetic unit utilizable in accordance with applicant's invention.

FIG. 3 schematically shows a magnetostrictive or sonic delay line having an input transducer 28 and a plurality of output transducers 30 spaced along the length of the delay medium. The delay medium may for example, comprise a nickel wire 32 supported at its ends by suitable damping pads 36 and having appropriate biasing magnets 38 operatively positioned adjacent the output transducers. Logical AND gating means 45 is associated with output transducers or taps, thus forming a dynamic arithmetic unit in accordance with the principles of applicant's invention. The two-input logical AND gates 45–0 through 45–9, as illustrated for a decimal encoder, are arranged to selectively gate, in response to the application of appropriate signals to the activation controls 33–0 through 33–9, an output from the respective output taps 31–0 through 31–9 as a single pulse propagates through the delay media.

In the embodiment shown, each logical AND gate 45 has two inputs: a first, 33, associated with an enabling control which may be derived, for example, from a switching means selectively controlled by a keyboard input, and a second 34 associated with one of the output taps 31 of the delay line. The outputs of the plurality of AND gates 45 are connected as the inputs to a logical OR gate 47. Thus, whenever an enabling control is activated at one of the AND gates, an output signal appears at OR gate 47 at the instant a pulse propagating through the delay media passes the associated output tap.

The basic operation of the dynamic arithmetic unit will now be explained in conjunction with the addition of two single-digit numbers, A and B. If the input pulse to the delay line 27 is assumed to be the time-domain encoding of the digit A, the pulse appearing at the input terminal 29 may be mathematically expressed as $t_A+t_0=AT/R$ where $t_0$, A and R defined as above, and T is the time interval between basic timing pulses.

If the logical AND gate 45 corresponding in the natural ordered sequence to the digit B is activated by suitable manipulation of switch control means, a pulse will appear at this AND gate at a time which may be expressed as:

$$t_B=t_A+Bd$$

If $d$ is expressed as $d=T/R$, then $$t_B=t_0+AT/R+BT/R$$

and $$t_B=t_0+(A+B)T/R$$

Thus, the pulse appearing as the output of the $B^{th}$ logical gate is the time-domain encoding of the sum of $A+B$.

To complete this dynamic delay-line addition scheme, provision must be made for detecting and executing a carry condition as well as restricting the range of the recorded sum digit. The restriction of the sum digit may be accomplished by employing a dynamic storage device, for example, a rotatable magnetic drum whereby one of a plurality of spaced-apart recording heads may be selected to write information generated during two different time intervals as if they were generated simultaneously. The carry condition, as hereinafter to be explained, may be effected by selectively inserting an extra unit of delay into the input or output path of the next higher order operation.

Figure 4:
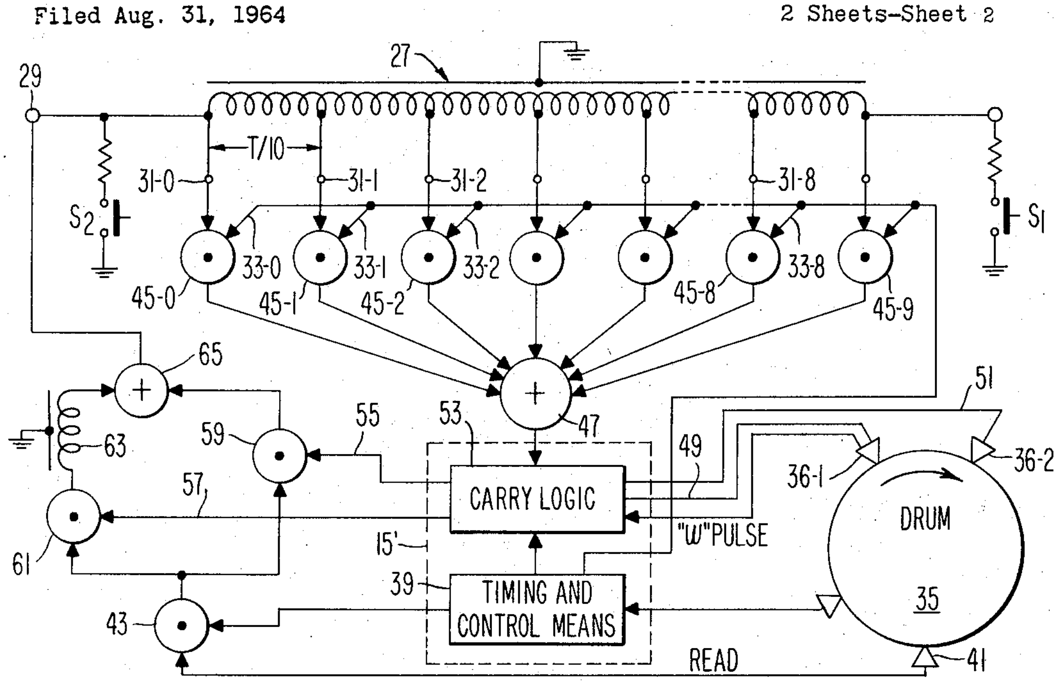
FIG. 4 is a schematic diagram illustrating the principles of applicant's invention embodied in a digital adder circuit.

The arithmetic unit schematically shown in FIGS. 3 and 4 with minor modifications, may be adapted to accomplish subtraction in accordance with the principles of applicant's invention. As is well known in the art, subtraction may be accomplished by summing the subtrahend digit and the complement of the minuend digit whereby the complement of the difference is generated. According to a first embodiment of applicant's invention, subtraction may be accomplished by launching a previously time-domain encoded minuend from an input terminal, not shown, at the end of the delay media opposite input terminal 29, while utilizing the subtrahend digit to selectively activate the appropriate AND gate 45 in the manner outlined above. In this embodiment, delay line 27 as shown in FIG. 4 would be properly terminated by opening switch $S_1$ and closing switch $S_2$. According to a second embodiment, subtraction may be accomplished in accordance with the principles of applicant's invention by launching the previously time-domain encoded minuend via input terminal 29, as discussed above, while employing the complement of the subtrahend to selectively activate the appropriate AND gate 45 in the manner outlined above in regard to the delay line adder. In either embodiment of the subtracter, the signal appearing at the output of the selectively activated AND gate is a time-domain encoded signal proportional to the difference of the minuend and subtrahend and, for example, in a digital substractor would be the time-domain encoding of the complement of the difference when the result of the subtraction is negative. This delay pulse, i.e., the complement of the difference, may then be applied to suitable apparatus, such as a plurality of coincidence detection circuits, to determine the total time delay undergone by the resultant signals. As is known in the art, the coincidence circuits may be connected so as to indicate the total delay in terms of the nines complement of the delay so that the actual coincidence circuit output corresponds to the difference between the minuend digit and the subtrahend digit.

To complete the subtraction scheme in accordance with the principles of the applicant's invention, provision must be made to logically detect and implement a borrow condition. As is well known in the art, the borrow condition may be implemented in a delay line calculator by deleting a unit delay in the path of the next higher order operation. This may be accomplished by monitoring on a time basis the output of OR gate 47 and interpreting an output signal developed within the first ten digit times after the initiation of the computation subcycle as a borrow, and in response thereto, activating appropriate logical gating to delete a unit of delay in the path of the next higher order operation and simultaneously selecting the appropriate write head to record the outcome of the computation.

Referring now to FIG. 4, a schematic diagram illustrating a digital adder embodying the applicant's invention is shown. It is to be understood that the choice of a digital adder to further explain the principles of applicant's invention is merely one possible choice and by properly choosing the length of the delay line, tap spacing, and basic timing interval, applicant's invention may be adapted, by one skilled in the art, to perform arithmetic operations in any desired numbering system.

As briefly explained in conjunction with FIG. 1 and further illustrated in FIG. 4, applicant's dynamic arithmetic delay line adder comprises a cyclic memory having a predetermined cycle of operation, a dynamic delay line arithmetic unit, and a pulse timing control means. As shown in FIG. 4, the cyclic memory comprises a rotatable magnetic drum 35 having a plurality of write heads 36–1 and 36–2 spaced about its periphery. The recording surface of the drum, as is well known in the art, may comprise a plurality of sections or tracks of magnetically retentive material of uniform density in which the signals to be recorded may be stored as selectively magnetized spots. Drum 35 may be driven from any suitable source such as, for example, an electric motor, not shown.

The digit organization within the registers of memory 35 is preferably adapted to accommodate time-domain encoded decimal numbers in which the magnitude of the decimal number is represented by magnetized spots in the corresponding digit positions. For purposes of simplicity, the drum memory in the embodiment illustrated in FIG. 4 will be assumed to comprise an accumulating register of ten digits. As would be evident to those skilled in the art, an extension to a greater number of registers or a change of word length would not materially alter the disclosed embodiment.

Details of the organization of data storage in the drum memory 35 are schematically shown in FIGS. *5a*, *5b*, and *5c*. Each track of the drum may be divided into a plurality of sectors as, for example, equal arcuate sectors for each time register as shown in FIG. 5*a*. Register organization and digit organization within each register are further shown in FIGS. 5*b* and 5*c* respectively. As shown in FIG. 5*b*, T units of time separate successive digit locations within a register. This separation of successive digits by T units of time prevents interference between successive pulses in the dynamic arithmetic unit by insuring that only one pulse will be present in the delay line at any one instant of time. As shown in FIG. 5*c*, the registers are adapted to store time-domain encoded information by storing a digit as a single pulse at the particular moment of the code corresponding to the value of the digit. As shown in FIGS. 5*b* and 5*c*, the beginning of the basic timing pulse T coincides with the beginning and end of each digit position and therefore the basic timing interval may be employed as a reference time to determine the presence of a carry condition.

Referring again to FIG. 4, applicant's dynamic digital arithmetic unit comprises a delay line 27 having an input terminal 29 and a plurality of output tape of terminals 31–0 through 31–9 positioned at intervals of $T/10$ units of delay along its length. Associated with each output tap of the delay line is a two-input AND gate 45 having one input selectively energizable in response to a signal appearing at the respective output tap and the other input selectively energizable in response to control signals from, for example, a keyboard. Each output of the plurality of AND gates 45–0 through 45–9 is individually connected as an input to OR gate 47. The logical gates may be of any type well known in the art, for example, diode gates in which an output signal is developed, in the case of the AND gate, when, and only when, all inputs are simultaneously present, and in the case of the OR gate, whenever a signal appears on any one of the associated inputs.

The control units 15 and 15' as shown in FIGS. 1 and 4 respectively, comprise a source of accurately spaced basic timing pulses, switching means controlled by an appropriate input device such as a keyboard, not shown, for selectively applying input pulses to one input of the AND gates associated with the output taps of the delay line, and logical sequence detection means for detecting and automatically inserting a unit delay into the next higher order operation in response to the detection of a carry condition. The basic timing source, hereinafter to be described, is arranged to generate a sequence of pulses T units of time to control the basic operation of the adder.

As shown in FIG. 4, the detection and implementation of a carry condition may be accomplished by monitoring the output of OR gate 47 and comparing, on a time basis, a signal emanating from OR gate 47 with the occurrence of successive basic timing pulses T. In the case of a digital adder, if a sum is not indicated, i.e., if a pulse does not emanate from gate 47 during the first ten digit pulse times, a carry condition is assumed to exist and a unit delay is automatically inserted into the next higher order computation. When a carry condition is recognized, a signal is generated by the carry logical unit 53 to activate AND gate 61, thereby inserting the unit delay 63 in series with the input of the time-domain encoded signal of the next higher order operation. In the event that a signal is generated from OR gate 47 prior to the expiration of the interval allotted for the first ten digit times after the initiation of the computation cycle, the no-carry condition is recognized and the carry logic activates AND gate 59 which permits normal operation of the input path to the delay line via AND gates 43, 61, and OR gate 65 during the next higher order operation.

The use of propositional logic and Boolean algebra, as well as graphical minimizational methods, such as the Venn diagram, the Karnaugh map, etc., to simplify and minimize the hardware necessary to implement a logical function is well known in the art. However, there are several factors of practical significance to the designer which often dictate the particular configuration of an electronic circuit utilized to implement a logic function. Such factors include the modules to be utilized, the number of inputs available with particular modules, and their fan-out or driving capabilities. Since the implementation of a particular logical function is not unique and may be accomplished by a number of electronic circuits having relatively equal economic and practical merit, the electronic circuitry for implementating applicant's logical carry detection unit 53 will not be discussed in detail. Any one of a number of embodiments which may be devised by those skilled in the art, which recognize logical conditions and initiate the proper activities in response thereto, would be equally applicable.

For a further understanding of the operation of the logical sequence detection unit 53 utilizable in applicant's digital delay line adder illustrated in FIG. 4, reference may be had to Table 1 below in conjunction with FIGS. 4 and 6. As hereinbefore stated, FIG. 4 illustrates the preferred embodiment of a digital adder embodying the principles of applicant's invention. FIG. 6 shows a logic flow diagram illustrating the logical conditions which must be recognized by logic unit 21 as shown in FIG. 1. In the following explanation, it is to be understood that the basic timing pulse $t_0$ marks the beginning of each digit time and $w$ is the signal applied to the logic unit 53 whenever an information bit is recorded via write head 36–1 during a computation cycle.

TABLE 1

| State: | Description |
|---|---|
| I | START CONDITION: Logic is in preset condition with normal, undelayed input path to terminal **29** of delay line **27** energized and write head **36–1** selected. |
| II | SUM≦9 HAS BEEN RECORDED: An output of OR gate **47** and write pulse $w$ have occurred prior to the expiration of the first ten digit pulse times, i.e., $(\overline{t_0}.w)$, therefore return to State I for beginning of next digit time. |
| III | SUM>9 IS PROBABLE: An output signal from OR gate **47** and a $w$ pulse have not occurred prior to the expiration of the first ten digit pulse times, i.e., $(t_0.\overline{w})$, therefore sum greater than 9 is probable. |
| IV | CARRY PRESUMED: As $w$ pulse has not occurred, a sum greater than **9** is assumed, therefore select write head **36–2** and prepare to implement a carry. |
| V | SUM>9 HAS BEEN RECORDED: A proper sum greater than 9 has been generated and recorded within the time interval of the first two timing pulses, therefore a carry condition exists. |
| VI | ERROR: In the event a $w$ pulse has not occurred during the interval of the first two timing pulses after initiation of the computation cycle an error is presumed, therefore activate alarm means and return to State I. |
| VII | CARRY EXISTS: A previous computation has resulted in the generation of a carry, therefore energize AND gate **61** thereby inserting the unit delay **63** into the input path of the next higher order digit and select write head **36–1**. |
| VIII | CARRY ADDED AND SUM≦9 HAS BEEN RECORDED: A previously developed carry has been executed and, as in State II, a sum less than 9 has been generated, therefore return to State I for beginning of next digit time. |

TABLE 1—Continued

| State: | Description |
| --- | --- |
| IX | CARRY ADDED AND SUM>9 IS PROBABLE: A previously developed carry has been executed and, as in State III, a sum greater than 9 is presumed, therefore proceed to State IV and continue next higher order computation cycle. |

As hereinbefore stated, the detection of a carry condition in a digital delay line adder embodying the principles of applicant's invention is accomplished by noting if a sum has been generated during the first ten digit pulse times, i.e., the time between two successive basic timing pulses $t_0$ after the start of the addition cycle. If no sum has been written in this time interval, a carry is presumed. FIG. 6 diagrams the various conditions which must be recognized by the carry control logic and the gating selection sequence which must result from the various conditions which may arise. Applicant has utilized three flipflops and 56 diodes to implement the carry detection logic, but as would be understood by one skilled in the art, the complexity of the carry detection circuit is a function of the data arrangement on the memory drum, and therefore the carry logic may well be simplified by implementing another scheme.

The operation of the basic addition cycle of applicant's adder may be subdivided into four basic sequential steps: First, the augend is time-domain encoded and entered into a preselected register of the cyclic memory. This may, for example, be accomplished by depressing the appropriate keys of a keyboard, not shown, to selectively control the output of the appropriate AND gate 45 associated with the output taps of the delay line 27, and subsequently applying a timing pulse $t_0$ to the input terminal 29. The timing pulse will propagate through the line and be tapped off after an appropriate delay proportional to the value of the digit to be encoded and this delay signal emanating from OR gate 47 may be written via write head 36–1 into a pre-selected memory location.

Second, the addend is entered on a keyboard, not shown, to selectively control switching means to develop appropriate control signals to be applied to the appropriate control input 33–0 to 33–9 of AND gate 45 associated with output taps 31, thereby introducing an effective delay proportional to the magnitude of the addend digit as the keyboard is selectively scanned. Third, in response to a cycle emanating command, the augend is read and erased from the memory and serially applied as time-domain encoded pulses in order from the less significant digit to the most significant digit via appropriate logic gates to the input terminal 29 of the delay line 27.

Auxiliary problems of memory addressing and selection, as applied to the first and third steps, have not been dealt with at length, for any one of the solutions well known in the art may be employed. For example, a multistate presettable counter may have a count preset therein which corresponds to a particular address location and thereafter the contents of the counter may be compared with memory location tags designating particular register locations of the cyclic memory, or the counter may be counted down by applying an appropriate source of pulses to locate a desired register within the memory. As is well known in the art, the read head 41 may be selectively energized when the desired memory locations properly positioned in relation to the preselected register location.

Fourth, the outcome of the arithmetic operation and the existence of a possible carry condition is determined by monitoring on a time basis the delay undergone by a previously time-domain encoded pulse in a delay line before an output signal is applied to the logic sequence detection means 53. As hereinbefore explained, AND gates 45 are arranged to selectively gate a signal from one of the taps from the delay line and apply the signal thus developed to the logic means 53 via OR gate 47. At the time the output pulse of OR gate 47 is generated, it has been delayed by an amount proportional to the magnitude of the augend, i.e., by previous time-domain encoding, plus an amount proportional to the magnitude of the addend, i.e., by the delay introduced by the propagation of the signal in the delay line before an output is selectively gated by AND gate 45 in response to the selective energization thereof by the control means and this signal, which is the time-domain encoding of the outcome of the arithmetic operation may be written into a preselected register of the memory.

To complete the explanation of the operation of applicant's delay line adder and to insure the generation of a proper outcome of a particular arithmetic problem, the detection and implementation of a terminal carry condition must be taken into account. A terminal carry may be defined as a carry which is generated during the highest order computation in a particular arithmetic calculation. In the preferred embodiment of applicant's delay line adder as has hereinbefore been described, a carry is detected by monitoring on a time basis the elapsed time between the initiation of a computation cycle and the generation and recording of an output signal. The execution or implementation of a carry is accomplished by inserting, as shown in FIG. 4, the unit delay 63 into the input path of the next higher order operation. Thus, to account for a terminal carry condition, it is necessary to apply another pulse to the input of the delay line following the recording of the output signal which resulted in the generation of the terminal carry.

One possible solution to the problem of the terminal carry involves a zero bit extension of the register whereby a zero pulse i.e. $t_0$, would automatically be applied to the input of the delay line after the highest order operation, thereby generating the time-domain encoding of the digit one if a terminal carry condition existed. Another possible solution to the problem of the terminal carry involves the application of a basic timing pulse to the input path after the highest order computation has occurred. Similarly, provisions would have to be included in the case of a subtracter embodying applicant's invention for the detection and execution of a terminal borrow condition.

To further illustrate the operation of applicant's digital delay line adder, let it be assumed that it is desired to add the number 211 to the number 911. As hereinbefore stated, the first step in accomplishing the addition of two numbers, according to applicant's invention, involves the time-domain encoding of the augend digits. In this example, with reference to FIG. 4, the units, tens, and hundreds digit of the augend would be entered in the appropriate columns of a keyboard, not shown, thereby controlling the effective delay undergone by successive timing pulses launched into the delay line. After the digits of the augend have been so entered, the columns of the keyboard would be scanned to selectively activate appropriate logical AND gates 45 to insure the generation of an output signal at a particular moment of the time-domain code, thereby generating signals which are the time-domain encoding of the digits of the augend. As the time-domain encoded signals representing the augend digits are generated, they would be recorded in a preselected register location of the cyclic memory 35.

As hereinbefore stated, the time-domain encoding, for example, of the augend units digit "1" may be accomplished by the selective actuation of the control input 33–1 of AND gate 45–1 and the subsequent application of a basic timing pulse $t_0$ to the delay line 27. After the pulse launched in the delay line has undergone one unit of delay, a signal is tapped off at AND gate 45–1. This signal thus generated has undergone one unit of delay and may then be recorded in the cyclic memory 35 as the time-domain encoded "1" in the least significant digit location of a preselected register. Similarly, the tens and hundreds digits of the augend would be time-domain encoded and stored as successive digits in the preselected register of the memory. Thereafter, the digits of the addend would be entered in the appropriate columns of the keyboard. The augend and addend digits, having thus been entered, the setup procedure is complete and the computation cycle may begin. In preparing the adder for a computation cycle, an appropriate clear button would normally be actuated to reset the carry logic to the normal no-carry condition.

Upon command from an appropriate add control, logical circuitry, not shown, would locate a preselected register in the memory containing the previously recorded augend digits and activate read head 41 when the preselected register is properly positioned. The previously time-domain encoded units digit would then be read and erased from the memory location and applied via the path, including the AND gates 43, 59, and OR gate 65, to the input terminal 29 of the delay line 27. This previously time-domain encoded pulse would propagate through the delay line at a characteristic velocity determined by the properties of the delay media while the units digit of the addend enabled the control input 33–1 of AND gate 45–1 in the manner hereinbefore described. Thus, a signal would appear at the output of AND gate 45–1 after two units of delay, i.e., one unit of delay introduced by the previously time-domain encoding of the augend units digit and another unit of delay introduced as the signal propagated from input terminal 29 to the position of tap 31–1 spaced therefrom in the direction of propagation along the delay line. The signal appearing at the output of AND gate 45–1 would be gated via OR gate 47 to the carry detection logic unit 53. Since the output signal of AND gate 45–1 has been generated within the first ten digit pulse times, measured from the initiation of the computation subcycle, a no-carry condition is recognized and the time-domain encoded pulse thus generated would be written into the preselected register of the cyclic memory 35 by means of write head 36–1.

Similarly, the tens digit would be withdrawn from the memory and applied via the no-carry path to the delay line input terminal 29 and, as before explained, this previously time-domain encoded signal would propagate through the delay line at the characteristic velocity. As before, the keyboard would be scanned and this time the tens digit of the addend would control the appropriate control input of AND gate 45. In this example, the control input 33–1 of AND gate 45–1 would again be energized and an output pulse, again would be gated from output tap 31 after a delay of two digit times. Thus, a time-domain encoding of the partial sum of the tens digits would be generated and, as before, since an output pulse was generated within the intervals of the first ten digit times after the initiation of the subcycle, a no-carry condition would be recognized and the partial sum, as before, would be recorded in the appropriate digit location of the preselected register.

Now the hundreds digit would be read and erased from the memory at the appropriate time and applied as before to the input terminal 29 of the delay line 27. At this time, the hundreds digit of the augend would selectively actuate the control input 33–2 of AND gate 45–2, the hundreds digit of the augend being the time-domain encoding of the digit 9 would be applied as the input to the delay line 27 and would have undergone the equivalent nine units of delay before it is applied to the input terminal 29.

By the time a pulse would be generated at tap 31–1, the first ten pulse times since the initiation of the computation subcycle would have elapsed and, as a signal has not generated at the output of OR gate 47, a carry condition would be presumed to exist. In response to the assumed carry condition, the carry detection logic circuit, as explained in Table 1 and FIG. 6, would select write head 36–2 and actuate AND gate 61, thereby automatically inserting the unit delay 63 into the input path of the next higher order operation. The pulse launched into the delay line would continue to propagate along the delay line, and in response to the pulse passing output tap 31–2, an output pulse would be generated at AND gate 45–2. This pulse would be the time-domain encoding of the partial sum of the hundreds digits of the example problem and would be recorded, as hereinbefore explained, via write head 36–2 in the preselected register of the cyclic memory 35.

In the example problem, the highest order computation has resulted in a terminal carry. Either of two hereinbefore explained techniques could be employed to execute the terminal carry thus generated. For purposes of explanation, the zero extension technique will be assumed. Thus, in the example problem, with no digit written into what in this example would be the thousands order digit location of the preselected register, a zero would automatically have been stored therein. The zero thus stored in what would correspond to the thousands order digit would be in order, sensed and read by read head 41, thus producing a pulse equivalent to a time-domain encoding of a zero, and this pulse would be applied as the next input to the delay line 27.

Since the hundreds order computation resulted in a terminal carry condition, the zero time-domain encoded pulse will be applied to the delay line input terminal 29 via the path including AND gate 61, the unit delay element 63, and the OR gate 65. Thus, the time-domain encoded pulse representing a zero will be delayed one unit of time before being applied to the input terminal of delay line 27. In the example problem, no augend digit has been entered in the thousands column and therefore AND gate 45–0 would be activated and an output pulse would thus be gated from tap 31–0. This output pulse would be gated via AND gate 45–0 and the OR gate 47, thus producing the time-domain encoded signal corresponding to a "1," and this signal representing the carry would be written by means of write head 36–1 into the appropriate digit position of the preselected memory location. Thus, the series addition of the units, tens, and hundreds order digits and the execution of the resulting terminal carry have been effected, thereby completing the computation of the example problem. The outcome of the computation would be available in the preselected memory location in the form of time-domain encoded signals and could be utilized to actuate appropriate read out devices as hereinbefore described.

As hereinbefore set forth, applicant's invention may readily be adapted to accomplish addition or substraction. As is well known in the art, multiplication and division can be implemented by successive addition and subtraction cycles, respectively, therefore the principles of applicant's invention may be employed to accomplish multiplication and division.

The embodiments shown in the foregoing figures are by way of explanation only, and it is to be understood that it is applicant's intention to be limited only as indicated by the scope of the following claims:

What is claimed is:

1. Apparatus for performing arithmetic operations comprising delay means consisting solely of a single continuous delay line, said single delay line having an input terminal and a plurality of output taps equally spaced along its length, the first output tap being directly coupled to the input terminal, a like plurality of conditionable gates respectively coupled to each of said output taps, means for conditioning a selected one of said gates proportionately representing the first digit in an arithmetic operation, and means for applying to said input terminal a signal predelayed in proportion to said output taps to represent a second digit in said arithmetic operation whereby a pulse emanates from said conditioned gate with a delay proportional to the outcome of the arithmetic operation.

2. The apparatus of claim 1 additionally including means for monitoring on a time basis the emanation of said pulse from said conditioned gates to detect the emanation thereof within a predetermined time interval.

3. Apparatus for performing arithmetic operations comprising, delay means having an input terminal and a plurality of output taps equally spaced along its length, the first of said taps in the direction of increasing delay being directly coupled to the input terminal, input means for launching signals into said delay means, gating means equal in number to said plurality of output taps for selectively gating signals froms said delay means, control means for conditioning a selected one of said gating means proportionately representative of a given number, cyclic memory means for recording signals received from said gating means as time-domain encoded signals, and means for extracting said time-domain encoded signals from said memory means and applying said extracted signals to said input terminal.

4. The apparatus of claim 3 additionally including means for monitoring on a time basis the gating of said signals from said delay line to detect the gating therefrom within a predetermined time interval.

5. Apparatus for electrically performing addition of numbers having at least one augend digit and at least one addend digit, each expressed in a common numbering system having a radix R comprising, a delay line having an input terminal and a plurality of output taps spaced along its length, a plurality of two input AND gates equal in number to said output taps wherein a first group of like inputs of said AND gates are individually coupled to said plurality of taps and wherein a second group of like inputs of said AND gates are adapted to receive control signals for individually conditioning each gate whereby a signal is gated from said conditioned AND gates when a signal is present in said delay line at a corresponding tap, cyclic magnetic memory means having a read head and a plurality of selectable write heads spaced apart in the direction of rotation for storing signals wherein said plurality of write heads includes at least a normal and a delayed write head, logic means responsive to signals emanating from said AND gates for determining the presence of a carry condition, first gating means responsive to the detection of a carry condition for selecting said delayed write head for writing the next signal emanating from said AND gates, second gating means responsive to the detection of a carry condition for introducing a unit delay representing a carry into the next higher order operation, first control means for selectively applying initiating pulses to said input terminal while said augend digits, in order from the least significant digit to the most significant digit, condition said AND gates, means for selectively recording signals emanating from said conditioned AND gates in said cyclic memory in the form of time-domain encoded signals, and means for selectively reading from said memory previously recorded time-domain encoded signals generated in response to said initiating pulses and applying said pulses in order of their generation to the input terminal while said addend digits, in order from the least significant digit to the most significant digit, successively condition said AND gates.

6. An apparatus for performing arithmetic addition of digital numbers comprising, a delay line having an input terminal and ten output taps equally spaced along its length, the first tap in the order of increasing delay being directly coupled to the input terminal, a cyclic memory having a read head and at least first and second write heads spaced apart in the direction of rotation, means for generating a pattern of timing pulses, means for storing a first group of numbers involved in said arithmetic addition in said memory in the form of time-domain encoded signals, a plurality of two input AND gates equal in number to said taps wherein a first group of like inputs of said AND gates are individually coupled to said taps and wherein a second group of like inputs of said AND gates are adapted to receive control signals for individually conditioning each gate whereby a signal is gated from said conditioned AND gate when a signal is present in said delay line at a corresponding tap, logic means responsive to said signals emanating from said AND gates and said pattern of timing pulses for determining the presence of a carry condition, first gating means responsive to said logic means for introducing the unit delay representing a carry into the next higher order operation, second gating means responsive to the detection of a carry condition for selecting said second write head for writing the next signal emanating from said AND gates into the memory, and means for selectively reading from said memory and successively applying, in order from the least significant digit to the most significant digit, said previously stored time-domain encoded pulses to said input terminal whereby the previously recorded time-domain encoded signals are further delayed an amount proportional to the second numbers involved in the arithmetic addition thereby generating a time-domain encoded signal proportional to the sum.

7. An apparatus for electrically performing subtraction of digital numbers having at least one minuend digit and at least one subtrahend digit comprising, a delay line having an input terminal and a plurality of output taps spaced along its length, the first tap in the direction of increasing delay being directly coupled to the input terminal, a plurality of two input AND gates equal in number to said output taps wherein a first group of like inputs of said AND gates are individually coupled to said taps and wherein a second group of like inputs of said AND gates are adapted to receive control signals for individually conditioning each AND gate whereby a signal is generated from said conditioned AND gates when a signal is present in said delay line at a corresponding tap, cyclic memory means having a read head and a first and second write head spaced apart in the direction of rotation for storing signals, means for generating a pattern of timing pulses, logic means responsive to said signals emanating from said AND gates and said pattern of timing pulses for determining the presence of a borrow condition, first gating means responsive to said logic means for deleting a unit delay representing a borrow in the path of the next higher order operation, second gating means responsive to the detection of a borrow condition for selecting said second write head for writing the next signal emanating from said AND gates into the memory, means for applying initiating pulses to said input terminal while said minuend digits successively, in order from the least significant digit to the most significant digit, condition said AND gates, means for selectively recording signals emanating from said conditioned AND gates in said cyclic memory in the form of time-domain encoded signals, and means for selectively reading from said memory the previously recorded time-domain encoded signals generated in response to said initiating pulses and applying said pulses in order of their generation to said input terminal while the nines complement of said subtrahend digit in order from the least significant digit to the most significant digit successively conditions said AND gates, thereby generating a time-domain encoded signal proportional to the difference of the minuend and subtrahend digits.

8. The apparatus of claim 5 wherein said delay line comprises a plurality of cascaded electrical delay elements having R output taps equally spaced along its length and wherein the first output tap of the ordered sequence in the direction of increasing delay is directly coupled to said input terminal.

9. The apparatus of claim 5 wherein said delay line comprises a magnetostrictive delay line having R output taps equally spaced along its length and wherein a first output tap of the ordered sequence in the direction of increasing delay is directly coupled to the input terminal.

10. The apparatus of claim 7 wherein said delay means comprises a plurality of cascaded electrical delay elements having ten output taps equally spaced along its length and wherein the first output tap of the ordered sequence in the direction of increasing delay is directly coupled to said input terminal.

11. The apparatus of claim 7 wherein said delay means comprises a magnetostrictive delay line having ten output taps equally spaced along its length and wherein the first output tap of the ordered sequence in the direction of increasing delay is directly coupled to said input terminal.

12. A system for performing the arithmetic combination of two numbers, each including at least one digit, wherein the numbers are expressed in a common numbering system having a radix R comprising, cyclic memory means having a plurality of memory locations for storing digital information, means for recording the digits of a first of said numbers in the form of time-domain encoded signals in said cyclic memory, means for sequentially withdrawing said recorded signals in order from the least significant digit to the most significant digit from said memory, means for delaying said previously time-domain encoded signals in order from the least significant digit to the most significant digit in an amount proportional to the corresponding digits of the second of said numbers involved in said arithmetic combination, said delaying means having a single input for receiving said previously time-domain encoded signals and a plurality of serially activated individually selectable outputs for producing time-domain encoded signals representing the combination of corresponding digits of said first and second numbers, means responsive to the outputs of said delaying means for detecting the presence or absence of time-domain encoded signals within a predetermined time interval having a duration dependent on the radix R of said numbering system, means controllable by said detecting means for recording said time-domain encoded output signals from said delaying means in said memory locations, and means controllable by said detecting means for inserting or deleting one unit of delay in the signal path of said delaying means during the next higher order digit delaying operation.

13. The system of claim 12, wherein said cyclic memory locations for storing said delayed signals each have a length of R*d* units of time, where R is said radix and *d* is the delay between successive time-domain encoded digits of said numbering system.

14. A system for performing the arithmetic addition of two numbers expressed in a common numbering system having a radix R wherein said numbers include at least one addend digit and at least one augend digit comprising, cyclic memory means having a plurality of memory locations for storing digital information, means for recording the digits of said augend in the form of time-domain encoded signals in selected ones of said memory locations, means for withdrawing said recorded signals in order from the least significant digit to the most significant digit from said memory, means external to said memory for delaying said withdrawn time-domain encoded signals in order from the least significant digit to the most significant digit an amount proportional to the corresponding digit of said addend, wherein said delayed signals represent the sum of said corresponding addend and augend digits, means coupled to the output of said delaying means for monitoring the delaying of said time-domain encoded signals on a time basis to detect the presence or the absence of said delayed signals within a predetermined time interval having a duration proportional to said radix R, means operable in first and second configurations for recording the output signals from said delaying means in said memory locations, said first configuration being responsive to the detection of the presence of said delayed signal within said time interval for recording said delayed signal in a predetermined one of said memory locations as the sum of said corresponding digits, said second configuration being responsive to the detection of the absence of a delayed signal within said time interval for recording said delayed signal in the same predetermined memory location as the partial sum of said corresponding digits, and means coupled to said monitoring means for inserting one unit of additional delay into the path of said delaying means during the next higher order digit withdrawing and delaying operation in response to the detection of the absence of a delayed signal within said time interval.

15. A system for performing the arithmetic subtraction of two numbers expressed in a common numbering system having a radix R wherein said numbers include at least one subtrahend digit and at least one minuend digit comprising, cyclic memory means having a plurality of memory locations for storing digital information, means for recording the digits of said minuend in the form of time-domain encoded signals in selected ones of said memory locations, means for withdrawing said recorded signals in order from the least significant digit to the most significant digit from said memory, means external to said memory for delaying said withdrawn time-domain encoded signals in order from the least significant digit to the most significant digit an amount proportional to the complement of the corresponding digit of said subtrahend, wherein said delayed signals are proportional to the difference of said corresponding subtrahend and minuend digits, means coupled to the output of said delaying means for detecting the presence or the absence of a delayed time-domain encoded signal within a predetermined time interval having a duration proportional to said radix R, means operable in first and second configurations for recording the output signals from said delaying means in said memory locations, said first configuration being responsive to the detection of the presence of a delayed signal within said time interval for recording said delayed signal in a predetermined one of said memory locations, said second configuration being responsive to the detection of the absence of a delayed signal within said time interval for recording the next delayed signal following said time interval in the same predetermined cyclic memory location, and means coupled to said detecting means for deleting one unit of delay from the path of said delaying means during the next higher order digit withdrawing and delaying operation in response to the detection of the presence of an output signal from said delaying means within said time interval.

References Cited

UNITED STATES PATENTS

| | | | |
|---|---|---|---|
| 2,749,037 | 6/1956 | Stibitz | 235—167 |
| 2,787,416 | 4/1957 | Hansen | 235—173 |
| 2,920,821 | 1/1960 | Gallichotte | 235—173 |
| 2,970,766 | 2/1961 | Epstein | 235—165 |

MALCOLM A. MORRISON, *Primary Examiner.*

M. J. SPIVAK, *Assistant Examiner.*